United States Patent
Cho et al.

(10) Patent No.: US 9,450,777 B2
(45) Date of Patent: Sep. 20, 2016

(54) ELECTRIC DEVICE, POWER MANAGEMENT SYSTEM AND METHOD FOR CONTROLLING THE SAME

(75) Inventors: Ji Young Cho, Seoul (KR); Hee Dong Kim, Namyangiu-si (KR); Yang Don Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 1059 days.

(21) Appl. No.: 13/370,450

(22) Filed: Feb. 10, 2012

(65) Prior Publication Data

US 2012/0219007 A1    Aug. 30, 2012

(30) Foreign Application Priority Data

Feb. 24, 2011  (KR) .................. 10-2011-0016460

(51) Int. Cl.
*H04L 12/28* (2006.01)
*G06Q 50/06* (2012.01)

(52) U.S. Cl.
CPC ........... *H04L 12/2825* (2013.01); *G06Q 50/06* (2013.01)

(58) Field of Classification Search
None
See application file for complete search history.

(56) References Cited

U.S. PATENT DOCUMENTS

| | | | | |
|---|---|---|---|---|
| 2004/0054747 | A1* | 3/2004 | Breh et al. .................... | 709/208 |
| 2006/0133392 | A1* | 6/2006 | Ajitomi .............. | H04L 12/2803 |
| | | | | 370/401 |
| 2007/0197236 | A1* | 8/2007 | Ahn et al. ..................... | 455/466 |
| 2010/0265955 | A1* | 10/2010 | Park et al. .................... | 370/400 |

* cited by examiner

*Primary Examiner* — Christine Duong
(74) *Attorney, Agent, or Firm* — Staas & Halsey LLP

(57) ABSTRACT

An electric device includes a communication unit to communicate with at least one of a gateway and a plurality of other electric devices, and a controller to broadcast a request signal for searching for a gateway, communicate with the gateway on the basis of a search response signal after transmission of the gateway response signal from at least one of the gateway and the plurality of other electric devices, and transmit a registration request signal to a power management unit through the gateway. Thus, the electric device can be automatically registered/re-registered in the electric device or be deleted from the electric device, a power management system and electric devices can be easily managed. If the user moves the electric device from a current position to another position, the power management system recognizes the movement and informs the user of the recognition result.

20 Claims, 6 Drawing Sheets

ELECTRIC DEVICE, POWER MANAGEMENT SYSTEM AND METHOD FOR CONTROLLING THE SAME

CROSS-REFERENCE TO RELATED APPLICATIONS

This application claims the benefit of Korean Patent Application No. 10-2011-0016460, filed on Feb. 24, 2011 in the Korean Intellectual Property Office, the disclosure of which is incorporated herein by reference.

BACKGROUND

1. Field

Embodiments of the present disclosure relate to an electric device for communication, a power management system and a method for controlling the same.

2. Description of the Related Art

With the development of Information Technology (IT), the number of household appliances powered by electricity is rapidly increasing, in turn leading to increasing power consumption. In order to satisfy such increased power demand, the number of power plants is rapidly increasing. However, as can be seen from a power demand pattern, peak capacity is not reached during most days of the year, that is to say, power plants only operate at full capacity during a few days out of the year.

A state in which a high power demand is required for a short time is called peak load. During periods of peak load, electricity costs the most to generate and deliver, and therefore power providers raise the power rate charged to consumers during periods of peak load Construction costs for adding an additional power plant to the grid are extremely high and maintenance costs for power plants constructed to maintain peak load for a short period of time are considerable.

Recently, numerous developers have conducted research into a demand management method for temporarily restricting power consumption by limiting peak load without constructing such additional power plants. For the aforementioned purposes, demand management is a focus of attention, and a great deal of research is focused upon an advanced demand management format for demand response (DR).

DR is a system for intelligently managing energy consumption depending upon variation in power rates, thereby balancing demand and supply of power.

By means of the DR, a power-supply source can alter end user power consumption to achieve load balancing and can restrict end user power consumption to periods where demand is low, thereby reducing the user's overall energy expenditure.

Therefore, an energy management system (EMS) to which demand response (DR) is applied has been developed. The EMS receives power rate information from the power provider, and displays the received power rate information through a display.

In addition, the EMS communicates with a variety of electric devices, and controls operations of individual electric devices on the basis of power rates. In this case, each electric device is a smart electric device capable of performing power monitoring and communication.

For communication between the EMS and the smart electric device, a user or administrator has to manually register the smart electric device in the EMS.

In this case, the user or administrator has to manually input a unique ID, an IP address and a gateway IP address of the smart electric device to the EMS, and has to manually input an IP address and a gateway IP address even to the smart electric device. In addition, the user or administrator has to input an ID and the like of the smart electric device to the gateway.

In addition, when the smart electric device is removed or replaced, the user or administrator has to manually delete a unique ID, an IP address, etc, of the corresponding smart electric device registered in the EMS.

As described above, according to the related art, when registration, re-registration, correction, or deletion of the electric device is performed in the EMS, the user or administrator has to manually input an ID, an IP address, etc. of the smart electric device, resulting in complicated processes and user inconvenience.

SUMMARY

Therefore, it is an aspect of the present disclosure to provide an electric device that communicates with a gateway and a power management unit (such as an EMS) using ad-hoc routing, and a method for controlling the same.

It is another aspect of the present disclosure to provide a power management system for performing automatic registration, re-registration, deletion and correction of the electric device in the EMS using mobile ad-hoc routing or network routing.

It is another aspect of the present disclosure to provide a power management system which enables an electric device to be removed from the EMS to be automatically deleted and automatically registers a newly installed or replaced electric device.

It is another aspect of the present disclosure to provide a power management system that stores an installation position of the electric device in the EMS. If the installation position of the corresponding electric device is changed, the corresponding electric device is re-registered. Such re-registration information is applied to a user, and an installation position of the corresponding electric device is acquired from the user, thereby correcting the installation position.

Additional aspects of the disclosure will be set forth in part in the description which follows and, in part, will be apparent from the description, or may be learned by practice of the disclosure.

In accordance with one aspect of the present disclosure, an electric device includes a communication unit to communicate with at least one of a gateway and a plurality of other electric devices; and a controller to broadcast a request signal for searching for a gateway, communicate with the gateway on the basis of a search response signal after transmission of the gateway response signal from at least one of the gateway and the plurality of other electric devices, and transmit a registration request signal to a power management unit through the gateway.

The controller may perform authentication with the gateway, and transmit a registration request signal to the gateway upon completion of the authentication.

The gateway search request signal may include a unique IP address, a unique ID, and destination information directed to the gateway, and the gateway response signal may include an IP address of the gateway and a forward route to the gateway.

The electric device may further include a storage unit to store a unique IP address, a unique ID, an IP address of the gateway, and a forward route, wherein the controller controls communication with the gateway on the basis of the IP address of the gateway, and controls transmitting the IP address, the ID, and the forward route to the power management unit.

The controller may further include a storage unit to store a NodeB list in which at least one of a wirelessly communicable gateway and a plurality of other wirelessly-communicable electric devices is used as a NodeB, upon receiving a gateway search request signal from at least one of the plurality of other electric devices, the controller may determine whether the gateway is present in the NodeB list, and control transmission of the gateway search response signal to the at least one other electric device when gateway information is present in the NodeB list.

The controller may control transmission of the gateway search request signal to other electric devices stored in the NodeB list when the gateway is not present in the NodeB list of the storage unit.

The controller may generate a reverse route when the gateway is present in the NodeB list of the storage unit.

The controller may determine which one of the other electric devices stored in the NodeB list of the storage unit is incapable of performing communication, and delete the determined electric device from the NodeB list.

The controller may transmit information regarding the unavailable-communication other electric device to the power management unit, and command the power management unit to delete the unavailable-communication other electric device.

The controller may regenerate the forward when the unavailable-communication other electric device is present in the forward route, and transmit the regenerated forward route to the power management unit.

If a plurality of forward routes exists and the unavailable-communication other electric device is present in at least one of the forward routes, the controller may delete the at least one forward route, and control communication with the gateway on the basis of the remaining forward routes.

The electric device may further include a display capable of being lighted on, wherein the controller, if an installation position setting signal is transmitted from the power management unit, controls lighting of the display.

In accordance with another aspect of the present disclosure, a power management system includes a plurality of electric devices to perform communication over an ad-hoc network; a gateway to communicate with at least one electric device over the ad-hoc network, after an authentication request signal of at least one electric device is transmitted from the at least one electric device, perform authentication with the at least one electric device, and register the at least one electric device upon completion of the at least one electric device; and a power management unit to register the at least one electric device upon receiving information regarding the at least one electric device from the gateway.

The power management unit may control lighting of the at least one electric device when an installation position setting signal of the at least one electric device is input, and, if a room is selected by the user, and include information regarding the selected room in registration information of the at least one electric device and performs registration.

The power management unit may delete registration information of the electric device under an unavailable communication state with the electric device.

The power management unit may determine whether a route of the electric device is regenerated, re-register the electric device when the route of the electric device is regenerated, and display an information message for an installation position change of the electric device.

In accordance with another aspect of the present disclosure, a method of controlling an electric device which communicates with at least one of a gateway and a plurality of other electric devices includes broadcasting a request signal for searching for a gateway; communicating with the gateway on the basis of a search response signal after transmission of the gateway response signal from at least one of the gateway and the plurality of other electric devices; and transmitting a registration request signal to the gateway and a power management unit.

The method may further include performing authentication with the gateway; and transmitting a registration request signal to the gateway upon completion of the authentication.

The method may further include upon transmission of the gateway search response signal, regenerating a forward route on the basis of the gateway search response signal, and storing the forward route.

The method may further include controlling communication with the gateway on the basis of an IP address of the gateway present in the gateway search response signal; and controlling transmission of an IP address of the electric device, an ID of the electric device, and a forward route.

The method may further include after transmission of a gateway search request signal from at least one of the other electric devices, determining whether the gateway is present in a NodeB list; controlling transmission of the gateway search response signal to the at least one other electric device if gateway information is present in the NodeB list; and if the gateway is not present in the NodeB list, controlling transmission of the gateway search request signal to the other electric devices stored in the NodeB list.

The transmission of the gateway search request signal may include transmitting an ID and IP address of the electric device that has generated the gateway search request signal.

The controlling of the transmission of the gateway search response signal to the at least one other electric device may include generating a reverse route from the gateway to an electric device having generated the gateway search request signal; deleting, if the unavailable-communication other electric device is present, the unavailable-communication other electric device from the NodeB list; and transmitting information regarding the unavailable-communication other electric device to the power management unit, and commanding the power management unit to delete registration information of the unavailable-communication other electric device.

The method may further include regenerating the forward route if the unavailable-communication other electric device is present in the forward route; and transmitting the regenerated forward route to the power management unit.

The method may further include, if a plurality of forward routes exists and the unavailable-communication other electric device is present in at least one of the forward routes, deleting the at least one forward route; and controlling communication with the gateway on the basis of the remaining forward routes.

The method may further include determining the presence or absence of an electric device incapable of performing communication; and broadcasting, if the presence of the unavailable-communication electric device is determined, information of the unavailable-communication electric device as a route error message.

The method may further include broadcasting a request signal for re-searching for the gateway; regenerating a forward route on the basis of the gateway search response signal when a gate search response signal is transmitted from at least one of the gateway and the other electric devices; and transmitting the regenerated forward route to the power management unit so as to request re-registration.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
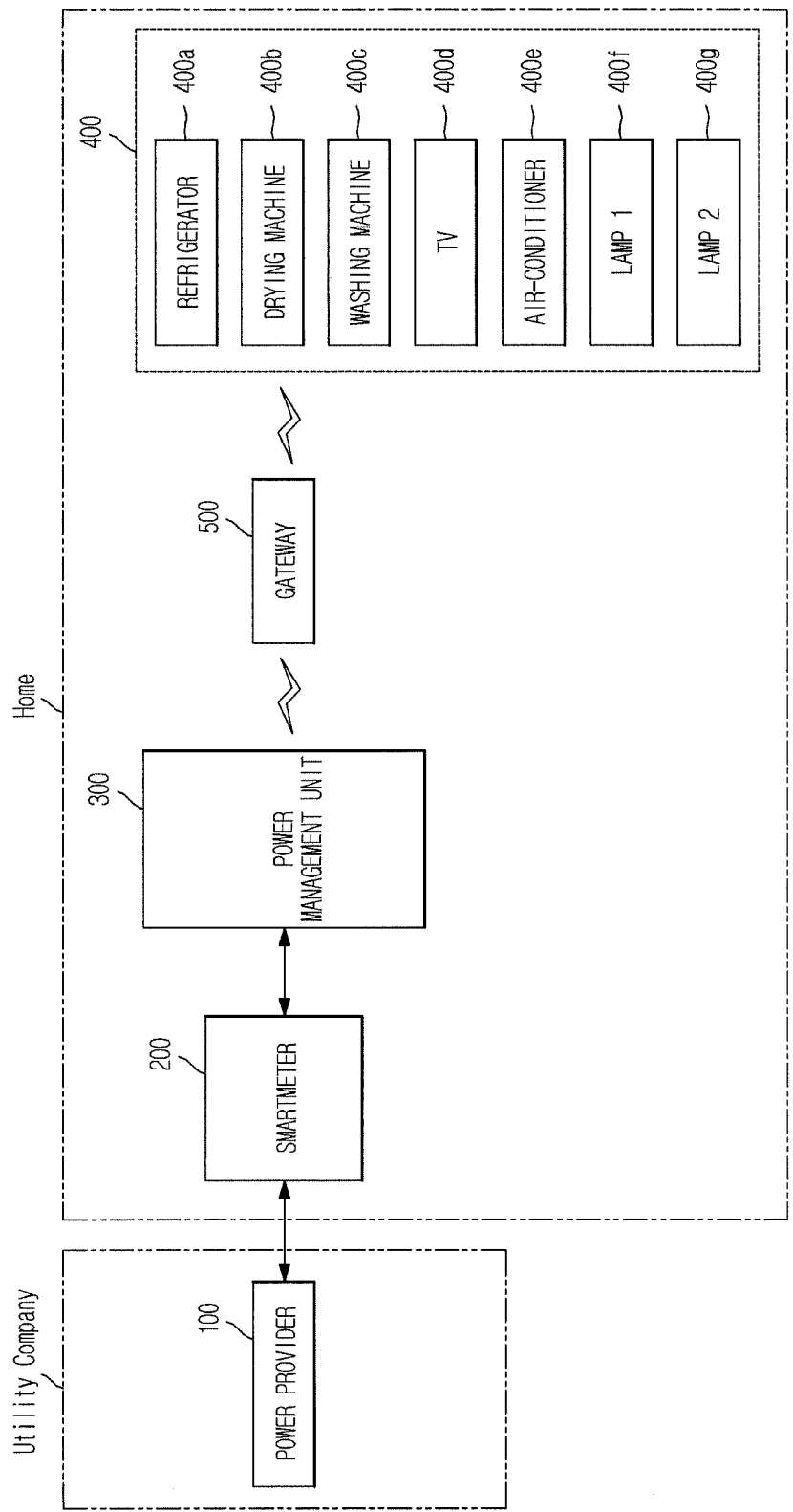
FIG. 1 is a block diagram illustrating a power management system according to an embodiment of the present disclosure.

Reference will now be made in detail to the embodiments of the present disclosure, examples of which are illustrated in the accompanying drawings, wherein like reference numerals refer to like elements throughout.

FIG. 1 is a block diagram illustrating a power management system according to an embodiment of the present disclosure.

Referring to FIG. 1, the power management system includes a power provider 100, a smartmeter 200, a power management unit 300, an electric device 400 and a gateway 500. If necessary, the power management unit may also be called an energy management system (EMS).

The power provider 100 is a power supply source that is operated by a power supply company (utility company) which generates and supplies power. The power provider 100 generates the power through atomic energy, hydroelectric power, geothermal power, wind power, etc., and provides the generated power to the electric device 400 installed in homes.

The power provider 100 predicts power consumption on the basis of the generation amount of electric power, the past power consumption information for every season and every period, and weather information, and determines power rates on the basis of the predicted power consumption. In this case, it may also be possible to establish a power rate level corresponding to the predicted power rate as necessary.

The power provider 100 controls power rates of each home to be elastically adjusted in response to power consumption of each home, and provides the adjusted power to each home, such that demand can be balanced.

The power provider 100 collects power consumption amounts of individual homes classified according to individual power rates, and stores the collected power consumption information according to individual power rates, such that the power-supply company calculates power rates (electricity bills) depending upon power consumption for individual power rate levels of each home per month, and charges each home the calculated electricity bills on a monthly basis.

The power provider 100 compares the periodically calculated monthly power rate (monthly bills) with monthly predetermined power rates so as to calculate power bills. If the calculated monthly power rates exceed the monthly predetermined power rates, information about the excess of the monthly predetermined power rates is transmitted to the power management unit 300 installed in the corresponding home, such that an event indicating the excess of monthly predetermined power rates is generated through the power management unit 300 installed in each home.

The power provider 100 stores a threshold power amount for each home, compares power consumption amounts for each home with a threshold power amount, and thus decides a power limitation amount. In this way, the power provider 100 manages the power demand of each home on the basis of the threshold power amount or the monthly predetermined power rates.

The power provider 100 is connected to the smartmeter 200 installed in each home, the power management unit 300, and the electric device 400 over a network, such that data regarding power demand management can be transmitted and received over the network. This network may be any of a wired network, a wireless network, a wired/wireless hybrid network, etc.

The smartmeter 200 is installed in each home, and includes a display such as a liquid crystal display (LCD), such that power consumed in each home is displayed in real time. The smartmeter 200 is an electronic meter, which bidirectionally communicates with the power provider 100 and transmits the consumed power amount to the power provider 100 and the power management unit 300.

The smartmeter 200 receives power rate information from the power provider 100, displays the received power rate information, and transmits the power rate information to the power management unit 300.

In addition, the smart meter 200 may further display a price level corresponding to the power rate information upon receiving the power rate information from the power provider 100, and may also transmit the power rate and price level information to the power management unit 300.

The power management unit 300 may also be referred to as a Demand Response (DR) controller. The power management unit 300 communicates with the smartmeter 200, and thus receives power rate information and power rate level information from the smartmeter 200.

The power management unit 300 communicates with a plurality of electric devices 400 (400a to 400g) such that it receives power rate information from the electric devices 400 and also transmits power rate information to the electric devices 400.

The power management unit 300 may also establish a power rate level on the basis of power rates upon receiving the power rates from the power provider 100. In this case, the power management unit 300 receives power rate information from the power provider 100 through the smartmeter 200 at intervals of a unit time, and establishes a power rate level for each piece of power rate information using the received power rate information per unit time.

The power management unit 300 receives information about excess monthly threshold power and information about excess monthly predetermined power rates from the power provider 100, and informs the user of the received information.

The power management unit 300 controls operations of the electric devices 400 so that it is designed to communicate with the electric devices 400.

The power management unit 300 stores a unique IP address and a unique IP address of the gateway 500. In addition, the power management unit 300 stores IDs and IP addresses of the electric devices 400. In this case, IDs and IP addresses of the electric devices 400 are transmitted from the gateway 500.

In other words, the power management unit 300 communicates with the electric devices 400 and controls the electric devices 400 using the IP address of the gateway 400 and IP addresses of the electric devices 400. A detailed description thereof will hereinafter be described with reference to FIG. 2.

Figure 2:
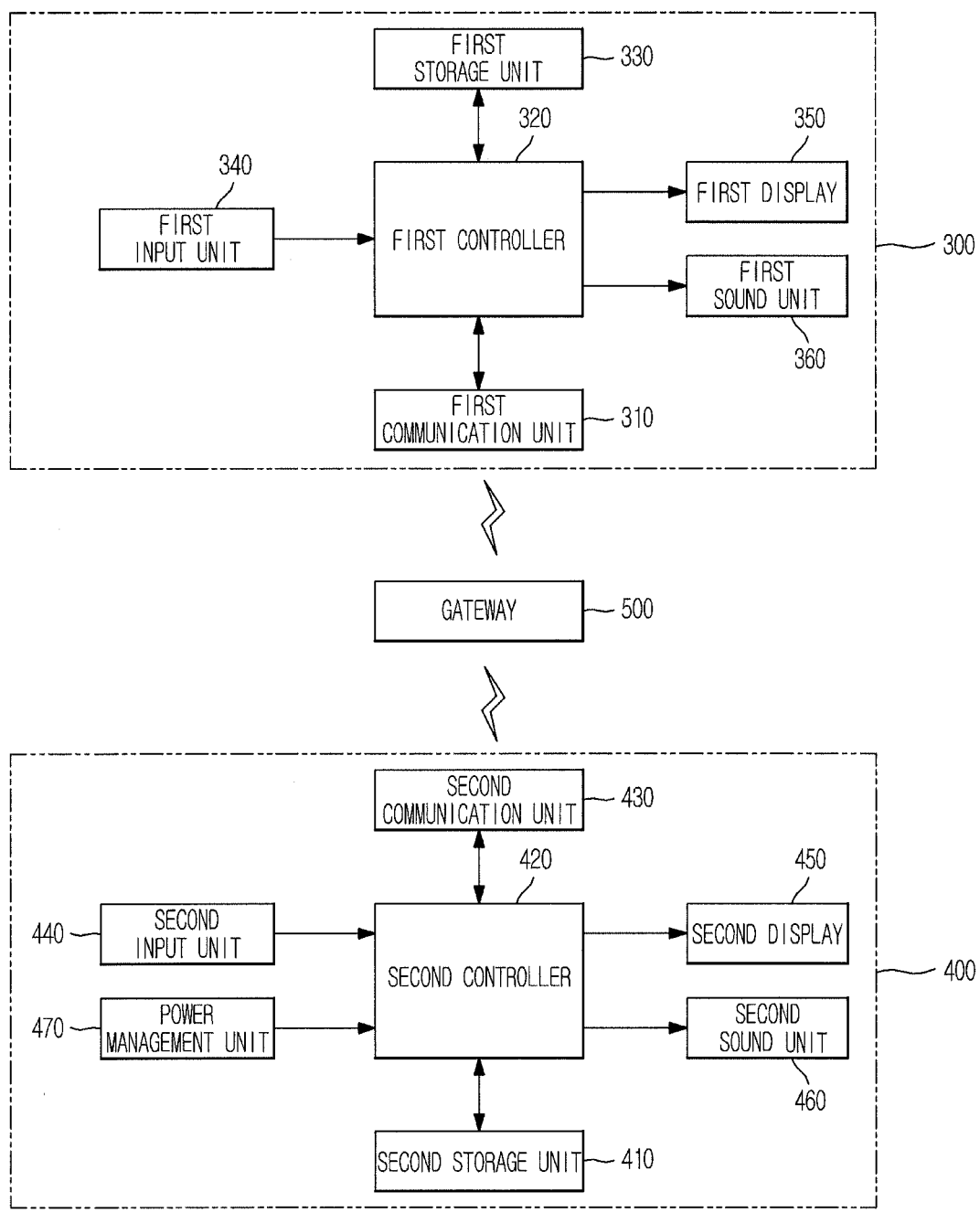
FIGS. 2 and 3 are block diagrams illustrating a power management system according to an embodiment of the present disclosure.

Referring to FIG. 2, the power management unit 300 includes a first communication unit 310, a first controller 320, a first storage unit 330, a first input unit 340, a first display 350, and a first sound unit 360.

The first communication unit 310 receives power rate information from the smartmeter 200 by communicating with the smartmeter 200, and transmits the received power rate information to the first controller 320. In this case, the power rate information may be at least one of a power rate and a power rate level corresponding to the power rate.

When the first communication unit 310 receives power rate information from the power provider 100, the power rate information may be one day's officially fixed price received from the power provider 100 or may be a power rate that is received in real time from the power provider 100.

The first communication unit 310 transmits an IP address, ID, etc. of the power management unit 300 to the gateway 500 in such a manner that the power-boosted reuse unit 300 is registered in the gateway 500. Thus, the first communication unit 310 can communicate with the gateway 500.

The first communication unit 310 receives IDs and IP addresses of the electric devices 400 from the gateway 500, and transmits them to the first controller 320.

The first communication unit 310 receives operation information and power consumption information from the electric devices 400 by communicating with the electric devices 400, such that it transmits the received information to the first controller 320.

The first communication unit 310 transmits an operation control signal to the electric device 400 upon receiving an indication message from the first controller 320, and transmits power rates for each hour or power rate levels for each hour.

If communication between the first communication unit 310 and the electric device 400 is severed, the first communication unit 310 automatically attempts to connect to the electric device 400 so that it may re-communicate with the corresponding electric device 400.

Under the condition that an electric device is newly installed or replaced with another electric device, if the first controller 320 receives a variety of information, (e.g., ID, IP address, forward route, and power consumption information) of the corresponding electric device 400 from the gateway 500, it registers the corresponding electric device 400 as an objective control device for power management.

The first controller 320 stores ID, IP, forward route, and power consumption information of the electric device 400 in the storage unit 330.

During the registration of the electric device 400, the first controller 320 also stores installation position of the corresponding electric device 400. In this case, the installation position is entered by the user.

For example, in the case where the same electric devices such as lamps or TVs are present and these electric devices are installed at different positions, an indication lamp of the second display of any one of electric devices is turned on so as to display which one of the electric devices is registered, and the user enters information regarding installation position where the electric device corresponding to the lighted indication lamp of the second display is located.

That is, the electric device corresponding to the lighted indication lamp of the second display is confirmed, a room containing the confirmed electric device is recognized, and a number or name of the recognized room is selected, so that installation position of each electric device is established.

If the first controller 320 re-receives a forward route from the electric device, this means that an installation position of the corresponding electric device is changed, and the first controller 320 re-registers the corresponding electric device and controls the first display 350, so that it directs the user to establish the installation position of the corresponding electric device.

In this case, if the use selects a desired electric device and presses an insulation position set button, the first controller 320 controls the indication lamp of the second display of the corresponding electric device 400 to be turned on. If the installation position is selected by the user, the first controller 320 establishes the selected installation position as a new installation position of the corresponding electric device, stores the establish installation position, and displays it on the first display 350.

Upon receiving unavailable communication electric device information from at least one electric device, the first controller 320 confirms an ID, an IP address, a NodeB list, and forward route of the unavailable communication electric device, and confirms the NodeB list of unavailable communication electric devices and a communication state of each electric device contained in the forward route, so that the first controller 320 may also analyze a variety of unavailable communication reasons, for example, elimination, installation position change, etc.

In addition, the first controller 320 may determine elimination of the corresponding electric device when communication connection is not achieved regardless of communication re-connection retrial, and may also query the user for the determined result.

In this way, the electric device can be easily registered in the power management unit 300, and registration information of the electric device can be easily corrected when installation position is changed. Even when the electric device registered in the power management unit 300 is eliminated or replaced, the conventional electric device can be easily deleted, and the replaced electric device can be automatically registered, so that user intervention can be minimized in case of registration, re-registration, correction, and deletion of the electric device.

If the first controller 320 receives an electric device registration signal from the first input unit 340, the first controller 320 transmits a re-registration control signal to all electric devices through the gateway 500. If re-registration information is received from all the electric devices through the gateway 500, the received information is stored in the first storage unit. In this case, installation position information of each electric device is also stored and registered.

The first controller 320 controls the operation of each electric device 400 on the basis of power rate information for each hour and power consumption information of each electric device 400.

In addition, if the first controller 320 receives power rate information in real time, it may predict a future power rate for each hour using a prestored past power consumption pattern, makes an operation schedule of each electric device 400 on the basis of the current power rate information and the future power rate information for each hour, controls the first display 350 to display the schedule, and controls the operation of each electric device 400 on the basis of the schedule.

The first controller 320 controls the first display 350 and the first sound unit 360 so as to inform the user of power rate information for each hour.

The first storage unit 330 stores unique ID and IP address, stores IDs and IP addresses of several electric devices, and stores an IP address of the gateway.

The first storage unit 330 stores user information, and stores power rates and power rate levels for each hour. If reservation information is transmitted from the electric device 400, the first storage unit 330 stores reservation information of the electric device 400. In this case, the user information may include the monthly threshold power amount, the monthly predetermined power rate, the allowed power for each hour, and personal user information.

In this case, the IP address is changed according to installation environment of the power management unit 300, so that it is automatically updated and stored upon completion of the power management unit 300.

The first input unit 340 includes an electric device selection button, an installation position set button, a room selection button, etc. If the indication lamp of the second display of the corresponding electric device is turned on during the electric device registration process, the user who uses the first input unit 340 selects a room for which an indication lamp of the second display is turned on.

Therefore, the power management unit 300 may control the operation of electric devices for each room on the basis of power rate information.

The first input unit 340 further includes an electric device re-registration button. If the electric device re-registration button is selected by the user, the selected electric device re-registration signal is transmitted to the first controller 320.

The first display 350 displays registration, re-registration, deletion, and installation position information of the electric device 400, When registering the electric device 400, an information message for informing the user of installation position setting of the electric device is displayed.

The first display 350 displays at least one of power rates for each hour and power rate levels for each hour, and displays an operation schedule of the electric device 400 according to an indication message of the first controller 320.

The first input unit 340 and the first display 350 are integrated into one body, so that the first display 350 may be configured in the form of a touchscreen.

The first sound unit 360 audibly outputs registration, re-registration, deletion, and installation position movement information of the electric device.

The first sound unit 360 audibly outputs at least one of power rates for each hour and power rate levels for each hour. The first sound unit 360 audibly outputs information about the excess of the allowed power, information about the excess of the monthly threshold power, and information about the monthly predetermined electricity bills.

The electric device 400 is a smart electric device that is capable of communicating with the gateway 500 and the power management unit 300. For example, there are a variety of smart electric devices 400, for example, a refrigerator 400a, a drying machine 400b, a washing machine 400c, a television 400d, an air-conditioner 400e, a first lamp 400f, a second lamp 400g, etc. Such electric devices 400 have different unique functions, but have the same control configuration for communication and power management.

That is, the electric device 400 receives power rate information and operation commands from the power management unit 300 by communicating with the power-boosted reuse unit 300 through the gateway 500, are operated in response to the received information, and transmits power consumption information for each operation mode to the power management unit 300 in real time.

The detailed description of the above-mentioned configuration will be given below with reference to FIG. 2.

Referring to FIG. 2, the electric device 400 includes a second storage unit 410, a second controller 420, a second communication unit 430, a second input unit 440, a second display 450, a second sound unit 460, and a power measurement unit 470.

The second storage unit 410 stores an ID, an IP address, power consumption, and forward route. The second storage unit 410 stores hopcount up to the gateway 500, stores an IP address of the gateway 500, and stores an IP address of the power management unit 300, so that it can communicate with the power management unit 300.

The second storage unit 410 stores the NodeB list. In this case, the NodeB list is the list of other electric devices connected to the electric device 400 over an ad-hoc network.

In this case, the NodeB list is the list of other electric devices connected to the electric device 400 over the ad-hoc network.

The second storage unit 410 stores a hopcount list. In this case, there are multiple hopcount lists from a second hopcount list to the N-th hopcount list. In this case, if the hopcount for the electric device that has requested gateway searching is set to N, the electric device that has requested gateway searching is stored in the N-th hopcount list. In addition, if the hopcount is set to 1, information regarding the electric device that has requested gateway searching is additionally stored in the NodeB list but not the first hopcount list.

The second storage unit 410 stores power rates for each hour.

If the electric device is newly installed or replaced with another, the second controller 420 broadcasts RREQ (Route Request) for requesting searching of the gateway 500. If RREP (Route Response) indicating a gateway search response signal is received from the gateway 500 or another electric device, the second controller 420 generates forward route and stores it in the second storage unit 410, and determines whether source electric device information contained in the RREP serving as a gateway search response signal is identical to information of the second controller 420. If the source electric device information contained in the RREP is identical to information of the second controller 420, the second controller 420 confirms IP information of the gateway 500 and communicates with the gateway 500. Otherwise, if the source electric device information contained in the RREP is different from the second controller information, the second controller 420 transmits the RREP to the next electric device on the basis of reverse route.

That is, the second controller 420 communicates with the gateway 500 on the basis of a forward route from among information contained in the RREP so that the electric device 400 is registered in the gateway 500 and the power management unit 300. In this case, the second controller 420 performs authentication with the gateway 500. Upon completion of the authentication, the electric device is automatically registered in the gateway 500.

If the electric device 400 is registered in the gateway 500 and the power management unit 300, the second controller 420 communicates with the power management unit 300 on the basis of the forward route. In this case, the second controller 420 controls the operation of the electric device on the basis of the operation command received from the power management unit 300.

The second controller 420 calculates a hopcount from an electric device (hereinafter referred to as a source electric device) that has requested gateway searching to the second controller 420 itself, and additionally stores the source electric device in the hopcount list on the basis of the calculated hopcount.

In this case, RREQ includes a variety of information, for example, a gateway acting as a destination (Dest), a source IP address (IP address of source electric device), a source ID, etc., and further includes not only a hopcount that is counted whenever the movement from the source electric device to another electric device occurs, but also reverse route, etc. created during gateway searching.

Upon receiving RREQ from another electric device, the second controller 420 determines whether the gateway 500 is present in the NodeB list stored in the second storage unit 410. If the gateway 500 is not present in the NodeB list, the second controller 420 broadcasts the RREQ to any electric device present in the NodeB list. If the gateway 500 is present in the NodeB list, the second controller 420 regenerates an RREP indicating a gateway search response signal, and unicasts the regenerated RREP on the basis of reverse route, so that an IP address of the gateway 500 is transmitted to the source electric device that has requested searching of the gateway 500.

If the gateway 500 is not present in the NodeB list, the second controller 420 controls the second storage unit 410 so that another electric device having transmitted the RREQ is added to the NodeB list.

The second controller 420, periodically communicates with the power management unit 300 on the basis of a forward route so as to determine the presence or absence of communication failure. If the presence of communication failure is determined, the second controller 420 commands each electric device present in the forward route to determine the presence or absence of communication failure.

If it is determined that the second controller 420 is unable to communicate with the gateway by the next-hop electric device from among electric devices present in the forward route, the second controller 420 broadcasts a route error (RRER) message to the electric device present in the NodeB list in such a manner that the next-hop electric device is removed. Therefore, the second controller 420 commands other electric devices to remove unavailable communication electric devices from the forward route, and commands forward route re-registration in response to removal of unavailable communication electric devices.

If the second controller 420 is located at a remote site at which the second controller 420 cannot directly communicate with the gateway 500, it communicates with the power management unit 300 on the basis of the forward route. Otherwise, if the second controller 420 is located at an available communication position, it may directly communicate with the power management unit 300 through the gateway 500.

Under the condition that the second controller 420 communicates with the gateway 500 on the basis of prestored forward route, if communication with the gateway 500 is impossible, the second controller 420 automatically broadcasts a gateway search request signal so as to regenerate a forward route, and transmits the regenerated forward route to the power management unit 300, so that the regenerated forward route is re-registered in the power management unit 300.

If an installation position is changed, the second controller 420 controls lighting of the second display 450, so that the user can select an installation position of the electric device.

Information as to whether the installation position is changed may be confirmed by regenerated forward route or the pressed installation position selection button. In addition, the aforementioned information as to whether the installation position is changed may also be confirmed through information indicating a communication state with the NodeB stored in the second storage unit 410 or information regarding communication strength.

By communication with the power management unit 300, the second communication unit 430 transmits operation information to the first communication unit 310 of the power management unit 300 in response to an indication message of the second controller 420, and transmits the operation control signal received from the first communication unit 310 of the power management unit 300 to the second controller 420.

The second communication unit 430 receives power rate information from the power management unit 300. In this case, the power rate information includes at least one of power rates for each hour and power rate levels for each hour corresponding to the power rates.

The second input unit 440 receives an operation command from the user, or receives a reservation time for the corresponding operation from the user, and transmits the received data to the second controller 420.

The second input unit 440 includes a registration button. If the registration button is entered by the user, the user-entered registration button signal may also be transmitted to the second controller 420.

The second display 450 includes a display lamp (not shown), and is turned on when installation position setting is achieved by a command of the first controller 320 of the power management unit 300.

The second display 450 displays power rates for each hour or power rate levels for each hour, and displays an operation state.

The second display 450 and the second display 440 are integrated into one body, so that the second display 450 may be configured in the form of a touchscreen.

The second sound unit 460 audibly outputs power rate information, and audibly outputs the start and end of each operation.

The second sound unit 460 audibly outputs registration, correction and installation position setting information to the gateway 500 and the power management unit 300.

The power measurement unit 470 measures or monitors power consumption of the electric device 400 in real time, and transmits the measured or monitored power consumption information to the second controller 420, so that it can detect actual power consumption of the electric device 400 and at the same time can update power consumption information stored in the second storage unit 430.

The power measurement unit 470 measures or monitors power not only using a voltage detected at both ends of an AC power line coupled to a power connector (not shown) of the electric device 400, but also using a current detected at any one of the AC power lines coupled to the power connector.

Figure 3:
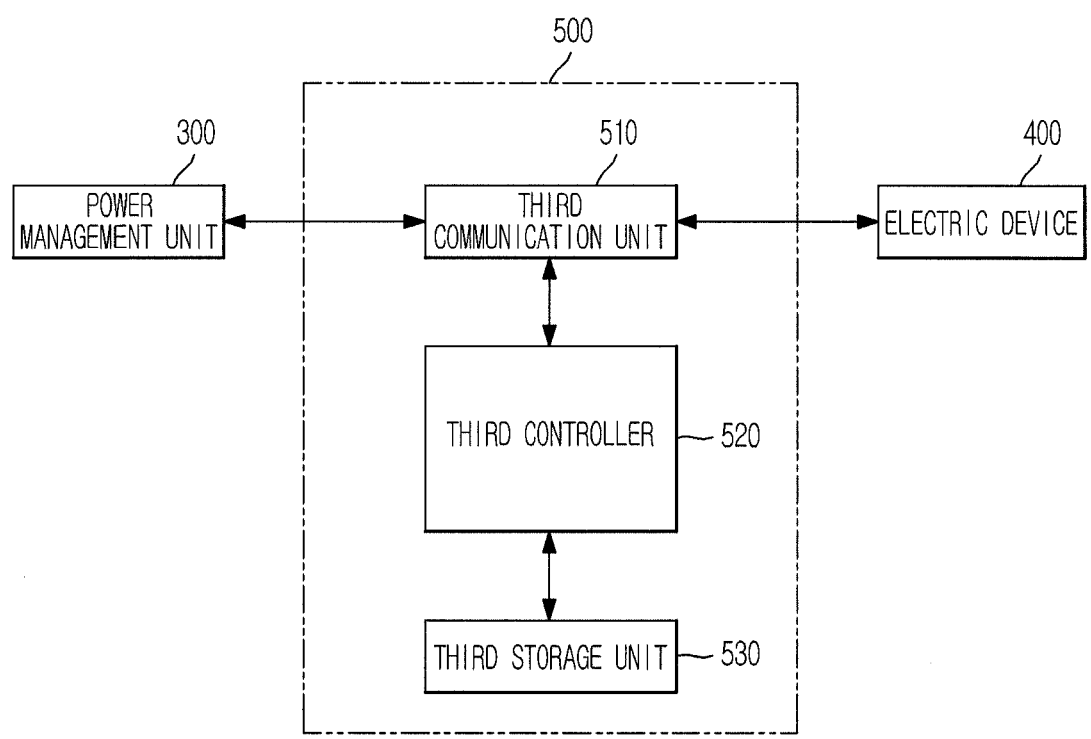

The gateway 500 implements communication between the power management unit 300 and each electric device 400. The gateway 500 includes a third communication unit 510, a third controller 520 and a third storage unit 530. The gateway 500 will hereinafter be described with reference to FIG. 3.

The third communication unit 510 implements communication between the power management unit 300 and the electric device 400 according to an indication message of the third controller 520. If a destination IP address form among transmission information of the electric device 400 is the power management unit 300, the third communication unit 510 transmits a variety of information of the electric device 400 to the power management unit 300. If the destination IP address from among transmission information of the power management unit 300 indicates at least one electric device 400, a variety of information of the power management unit 300 is transmitted to the corresponding electric device.

If the third controller 520 receives an authentication signal from at least one electric device from among multiple electric devices 400, it authenticates the corresponding electric device, registers an ID and IP address of the corresponding electric device, and transmits ID and IP address information of the corresponding electric device to the power management unit 300.

If the third controller 520 receives a deletion signal of another electric device from the power management unit or any one electric device, it commands the third storage unit 530 to delete another electric device information from the third storage unit 530.

The third controller 520 may also control authentication and registration of the power management unit 300.

The third storage unit 530 stores an IP address of the gateway 500, stores ID and IP address of the authenticated power management unit 300, and stores IDs and IP addresses of the authenticated electric devices 400.

In addition, in response to an indication message of the third controller 520, the third storage unit 530 deletes ID and IP address of the electric device, and restores ID and IP address of the replaced electric device.

Figure 4:
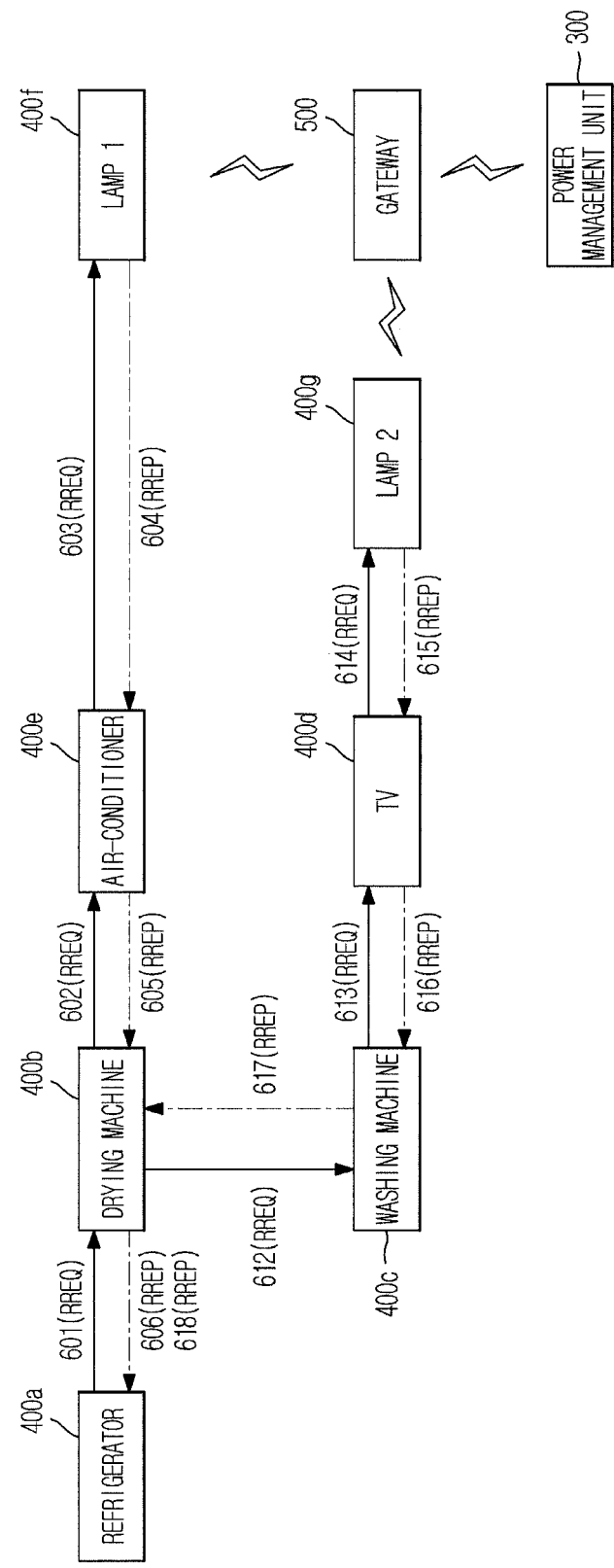
FIGS. 4 to 6 are conceptual diagrams illustrating exemplary control of a power management system according to an embodiment of the present disclosure
Figure 5:
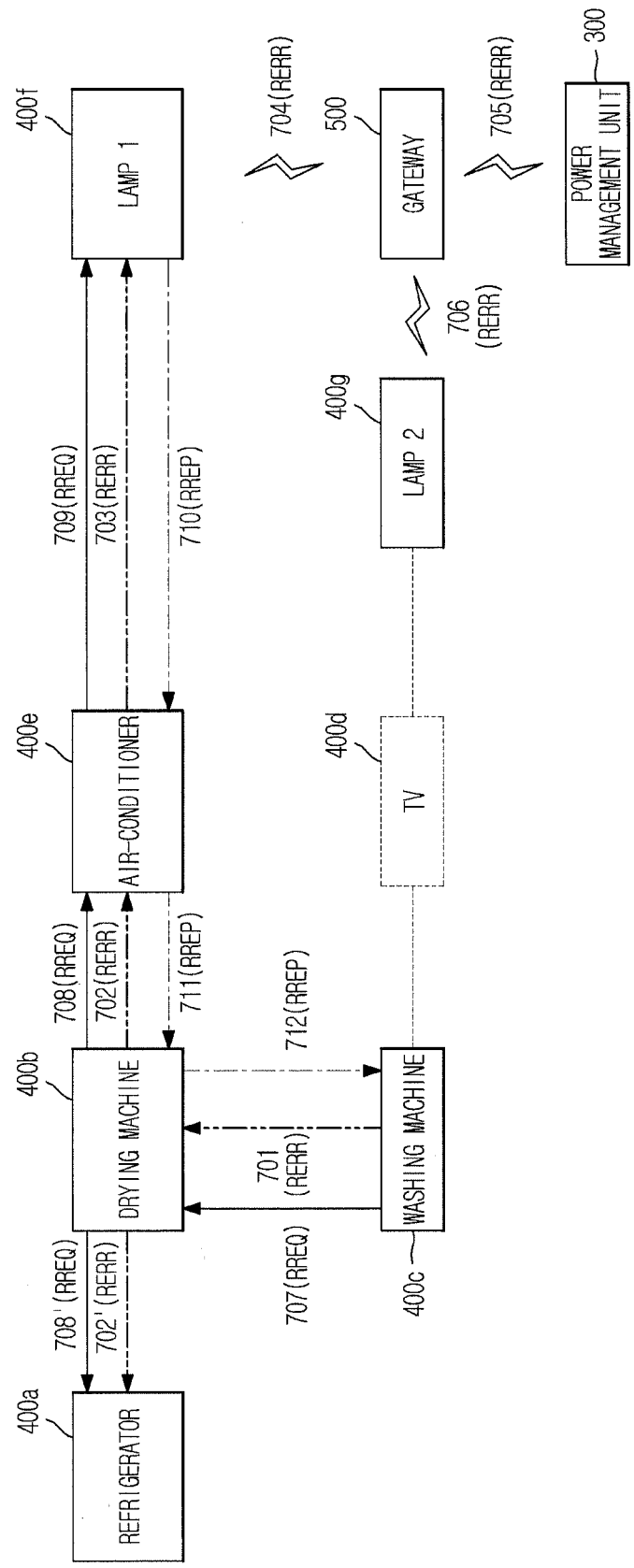
Figure 6:
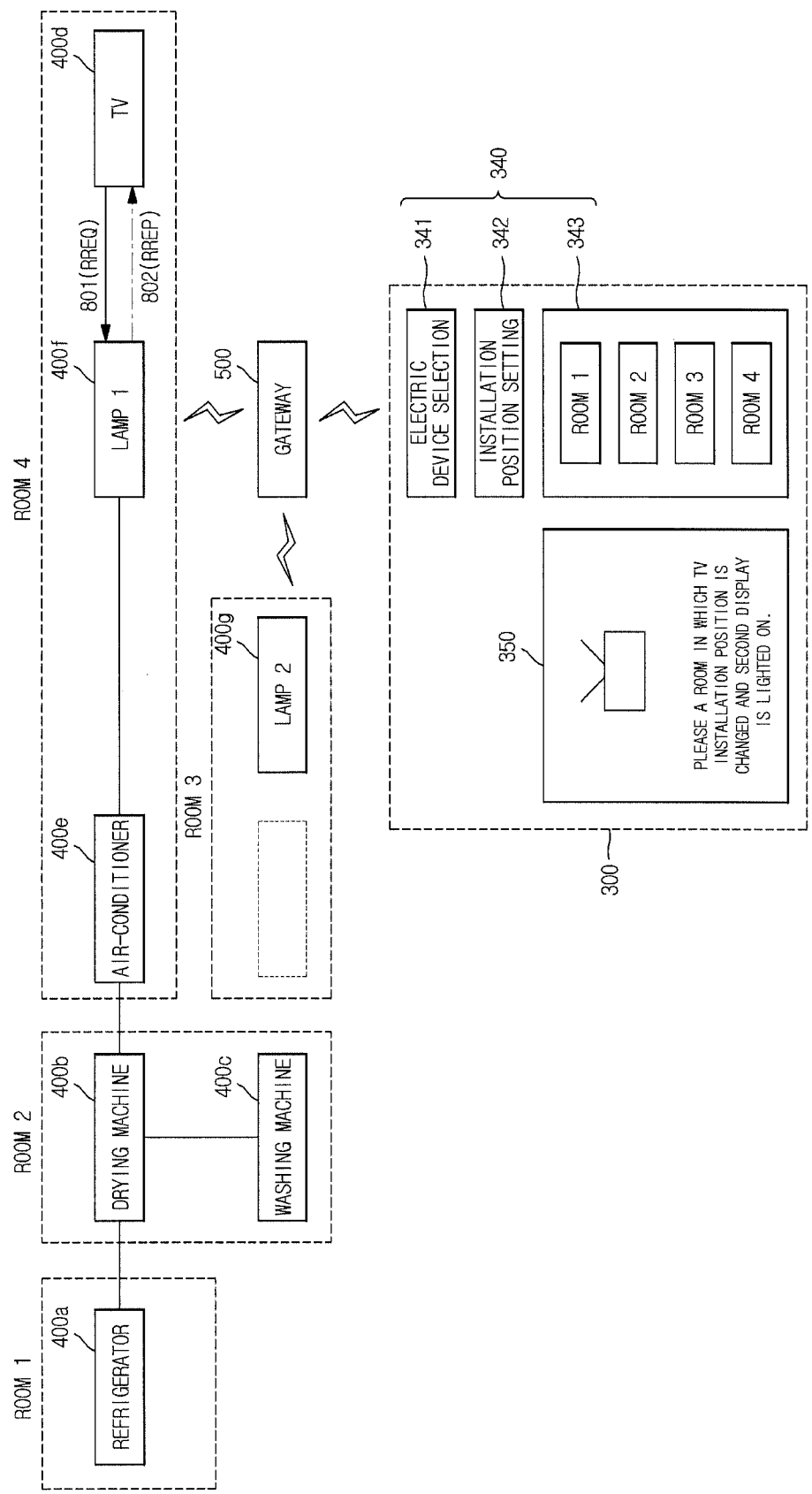

FIGS. 4 to 6 are conceptual diagrams illustrating exemplary control of a power management system according to an embodiment of the present disclosure. The exemplary control of the power management system will hereinafter be described with reference to FIGS. 1 to 3.

FIG. 4 is a flowchart illustrating registration control of the electric device contained in the power management system.

Referring to FIG. 4, under the condition that a drying machine 400b, a washing machine 400c, a TV 400d, an air-conditioner 400e, a first lamp 400f, and a second lamp 400g are pre-installed in a home and then registered in the gateway and the power management unit, if the user first purchases or replaces the refrigerator 400a, it is necessary for the refrigerator 400a to be registered in the gateway and the power management unit, and a detailed description thereof will hereinafter be described with reference to the annexed drawings.

In addition, it is assumed that the air-conditioner 400e and the washing machine 400c are stored in the NodeB list of the drying machine 400b, the first lamp (lamp 1) 400f is stored in the NodeB list of the air-conditioner 400e, the gateway 500 is stored in the NodeB list of the first lamp 400f, the TV 400d is stored in the NodeB list of the washing machine 400c, the second lamp (Lamp 2) is stored in the NodeB list of the TV 400d, and the gateway 500 is stored in the NodeB list of the second lamp (Lamp 2).

If the refrigerator 400a is initially powered on or receives a registration button of the second input unit 340, the refrigerator 400a broadcasts RREQ (Route Request) for a gateway searching request at operation 601.

In this case, RREQ includes a destination indicating a gateway (Dest. type: gateway), a hopcount of 0, a source IP address corresponding to a refrigerator IP address, and a source ID corresponding to a refrigerator ID.

Subsequently, the RREQ broadcast from the refrigerator 400a is received in the drying machine 400b that is capable of communicating with the refrigerator 400a.

The drying machine 400b determines whether the gateway 500 is present in the NodeB list of the second storage unit. The NodeB list of the drying machine 400b includes the air-conditioner 400e and the washing machine 400c, so that the drying machine 400b determines the absence of the gateway in the NodeB list.

The drying machine 400b adds the refrigerator 400a to the NodeB list (also called 'NB list') of the drying machine 400b, changes a hopcount to '1', generates a reverse route "drying machine→refrigerator", and broadcasts an RREQ to the air-conditioner 400e and the washing machine 400c at operations 602 and 612.

In this case, the RREQ includes a destination indicating a gateway (Dest. Type: Gateway), a hopcount of 1, a source IP address acting as the refrigerator IP address and a source ID acting as the refrigerator ID.

The air-conditioner 400e and the washing machine 400c receive the RREQ broadcast from the drying machine 400b.

The first case in which the RREQ broadcast from the drying machine 400b is received in the air-conditioner 400e will hereinafter be described in detail.

The air-conditioner 400e determines whether the gateway 500 is present in the NodeB list of the second storage unit. The air-conditioner 400e determines the presence of the first lamp 400f in the NodeB list. That is, the air-conditioner 400e determines the absence of the gateway 500 in the NodeB list.

Therefore, the drying machine 400b is added to the NB list of the air-conditioner 400e, the air-conditioner 400e changes a hopcount to '2', and the refrigerator 400a is added to the second hopcount list of the air-conditioner 400e, such that the air-conditioner 400e generates a route "air-conditioner→drying machine→refrigerator" and then the RREQ is transmitted to the first lamp 400f present in the NB list of the air-conditioner 400e at operation 603.

In this case, the RREQ includes a destination indicating a gateway (Dest. Type: Gateway), a hopcount of 2, a source IP address, and a source ID.

In this case, the first lamp 400f includes the RREQ, and determines whether the gateway 500 is present in the NB list of the second storage unit.

Since the NB list of the lamp 1 400f includes the gateway 500, the first lamp 400f determines the presence of the gateway 500 in the NB list.

Therefore, by the first lamp 400f, the air-conditioner is added to the NB list of the first lamp 400f, a hopcount is changed to '3', the hopcount of 3 is stored, and the refrigerator 400a is added to a third hopcount list of the first lamp 400f.

Subsequently, the first lamp 400f generates a reverse route "gateway→Lamp 1→air-conditioner→drying machine→refrigerator", and unicasts the RREP along the reverse route. That is, the first lamp (Lamp 1) 400f unicasts the RREP to the air-conditioner along the reverse route at operation 604.

In this case, the RREP includes an IP address, a reverse route, a source IP address, and a source ID of the gateway 500.

The first lamp (Lamp 1) 400f registers the forward route.

In this case, the forward route includes information "destination=gateway, and hopcount=1". In other words, the hopcount 1 means that only one hop is present in the range from the first lamp 400f to the gateway 500.

Subsequently, the air-conditioner 400e receives the RREP unicast from the first lamp 400f, and confirms an IP of the source electric device using the RREP. In this case, since an ID of the air-conditioner 400e is different from the source electric device ID, the air-conditioner 400e unicasts the RREP to the drying machine 400b acting as the next electric device on the basis of the reverse route at operation 605.

In this case, the RREP includes an IP address of the gateway, a reverse route, a source IP address, and a source ID.

The air-conditioner 400e registers the forward route.

In this case, the forward route includes information "next hop=Lamp 1, destination=gateway, and hopcount=2". In other words, the hopcount of 2 means that two hops are present in the range from the air-conditioner to the gateway 500.

The drying machine 400b receives the RREP unicast from the air-conditioner 400e, and confirms an ID of a source electric device using the RREP. In this case, an ID of the drying machine 400b is different from an ID of the source electric device, so that the drying machine 400b unicasts the RREP to the refrigerator 400a on the basis of a reverse route at operation 606.

The drying machine 400b registers the forward route.

The forward route includes specific information "next hop is an air-conditioner, a destination is a gateway. And a hopcount is 3". That is, the hopcount 3 means the presence of 3 hops in the range from the drying machine to the gateway 500.

The refrigerator 400a receives the RREP unicast from the drying machine 400b, and confirms an ID of the source electric device using the RREP. In this case, an ID of the refrigerator 400a is identical to an ID of the source electric device, so that the drying machine 400b registers a forward route.

The forward route includes specific information "next hop is drying machine, destination is a gateway, and a hopcount is 4". That is, the hopcount 4 means the presence of 4 hops in the range from the refrigerator to the gateway 500.

An exemplary case in which the RREQ broadcast from the drying machine 400b is received in the washing machine 400c will hereinafter be described in detail.

If the drying machine 400b broadcasts the RREQ at operation 612, the washing machine 400c receives the RREQ.

Subsequently, the washing machine 400c determines whether the gateway 500 is present in the NB list of the second storage unit. Since the TV 400d is present in the NB list of the washing machine 400c, the washing machine 400c determines the absence of the gateway 500 in the NB list.

Therefore, the drying machine 400b is added to the NB list of the washing machine 400c, a hopcount is changed to 2, the refrigerator 400a is added to a second hopcount list of the washing machine 400c, a reverse route "washing machine→drying machine→refrigerator" is generated, and the washing machine 400c unicasts the RREQ to the TV 400d contained in the NB list of the washing machine 400c at operation 613.

In this case, the RREQ includes a destination indicating a gateway (Dest. type: Gateway), a hopcount of 2, a source IP address and a source ID. In this case, the hopcount of 2 means that there are two hops in the range from the refrigerator acting as a source electric device to the washing machine.

In this case, the TV 400d receives the RREQ, and determines whether the gateway 500 is present in the NB list of the second storage unit. The TV 400d determines the absence of the gateway 500 in the NB list.

Therefore, the washing machine 400c is added to the NB list of the TV 400d, a reverse route "TV→washing machine-→drying machine→refrigerator" is generated, a hopcount is changed to 3, the refrigerator 400a is added to a third hopcount list of the TV 400d, and the TV 400d transmits the RREQ to the second lamp 400g present in the NB list of the TV 400d at operation 614. In this case, the hopcount of 3 means that there are 3 hops in the range from the refrigerator acting as a source electric device to the TV.

The second lamp 400g receives the RREQ, and determines the presence of the gateway 500 in the NB list of the second storage unit. The second lamp 2 400g determines the presence of the gateway 500 in the NB list.

Therefore, the second lamp 400g adds the TV 400d to the NB list of the second lamp 400g, a hopcount is changed to 4, and the refrigerator 400a is added to a fourth hopcount list of the second lamp 400g.

The second lamp 400g generates a reverse route "gateway→lamp 2→TV→washing machine→drying machine→refrigerator", and unicasts the RREQ along the reverse route. That is, the second lamp (lamp 2) 400g unicasts the RREP to the TV 400d along the reverse route at operation 615.

In this case, the RREP includes an IP address, a reverse route, a source IP address, and a source ID of the gateway.

In addition, the second lamp 400g registers the forward route.

In this case, the forward route includes specific information "destination=gateway, and hopcount=1". That is, the hopcount of 1 means that there is only one hop from the second lamp 400g to the gateway 500.

The TV 400d receives the unicast RREP, and confirms an ID of the source electric device using the RREP. In this case, an ID of the TV 400d is different from an ID of the source electric device, so that TV 400d unicasts the RREP to the washing machine 400c on the basis of the reverse route at operation 616.

The TV 400d registers the forward route.

In this case, the forward route includes specific information "next hop=Lamp 2, destination=gateway, and hopcount=2". That is, the hopcount of 2 means that there are two hops in the range from the TV to the gateway.

Subsequently, the washing machine 400c receives the RREP unicast from the TV 400d, and confirms an ID of the source electric device using the RREP. In this case, an ID of the washing machine 400c is different from an ID of the source electric device, so that the washing machine 400c unicasts the RREP to the drying machine 400b on the basis of the reverse route at operation 617.

The washing machine 400c registers the forward route.

In this case, the forward route includes specific information "next hop=TV, destination=gateway, and hopcount=3". That is, the hopcount of 3 means that there are 3 hops in the range from the washing machine 400c to the gateway 500.

Subsequently, the drying machine 400b receives the RREP unicast from the washing machine 400c, and confirms an ID of the source electric device using the RREP. In this case, an ID of the drying machine 400b is different from an ID of the source electric device, so that the drying machine 400b unicasts the RREP to the refrigerator 400a on the basis of the reverse route at operation 618.

The drying machine 400b registers the forward route.

In this case, the forward route includes specific information "next hop=TV, destination=gateway, and hopcount=3". That is, the hopcount of 3 means that there are 3 hops in the range from the washing machine 400c to the gateway 500.

In this case, the forward route includes specific information "next hop=washing machine, destination=gateway, and hopcount=4". That is, the hopcount of 4 means that there are four hops in the range from the drying machine to the gateway.

Subsequently, the refrigerator 400a receives the RREP unicast from the drying machine 400b, and confirms an ID of the source electric device using the RREP. In this case, an ID of the refrigerator 400a is identical to an ID of the source electric device, so that the refrigerator 400a registers the forward route.

In this case, the forward route includes specific information "next hop=drying machine, destination=gateway, and hopcount=5". That is, the hopcount of 5 means that there are 5 hops in the range from the refrigerator to the gateway.

In this way, the refrigerator 400a enables two forward routes to be registered. In more detail, the first one of the two forward routes is a forward route "refrigerator→drying machine→lamp 1→gateway" having a hopcount of 4, and the second one is a forward route "refrigerator→drying machine→washing machine→lamp 2→gateway" having a hopcount of 5.

The refrigerator 400a may select any one of two forward routes in such a manner that the refrigerator 400a can be registered in the gateway and the power management unit.

For higher-speed communication, the refrigerator 400a may also select a forward route having a small hopcount.

Subsequently, the refrigerator selects the forward route, communicates with the gateway 500 along the selected forward route, and transmits a registration request to the gateway.

Upon receiving the registration request from the refrigerator 400a, the gateway 500 performs authentication with the refrigerator 400a. Upon successful completion, the gateway 500 registers the refrigerator 400a and stores the registered information in the third storage unit 530. Then, the gateway 500 communicates with the power management unit 300, so that it transmits information of the refrigerator 400a and the refrigerator 400a can be registered in the power management unit 300.

By the above-mentioned authentication process between the gateway 500 and the refrigerator 400a, the refrigerator 400a is automatically registered in the gateway 500. In this case, the authentication process may follow the logic defined in SEP2.0 (Smart Energy Profile 2.0).

Subsequently, the power management unit 300 communicates with the refrigerator 400a, establishes an installation position of the refrigerator 400a, stores the established installation position, and controls the refrigerator by communicating with the refrigerator 400a.

In this case, the installation position may be established by the user, and a detailed description thereof will hereinafter be described.

The power management unit 300 displays a message indicating that the refrigerator 400a is registered in both the gateway 500 and the power management unit 300 on the first display 350, and also displays a message for selection of an installation position of the refrigerator on the first display 350.

The power management unit 300 turns on the second display 450 by controlling the second display 450 of the refrigerator. If a desired room is selected through the first input unit 340, information regarding the selected room is contained in the registration information of the refrigerator 400a, and then stored. As a result, an installation position of the refrigerator 400a can be established by the user.

FIG. 5 is a flowchart illustrating a method for re-registering other electric devices that communicate with a gateway through a first electric device, after the first electric device has been removed from the power management system.

Referring to FIG. 5, if it is assumed that the TV 400d is out of order so that it is removed, an exemplary method for deleting registration information of the TV 400d from the power management unit 300 and re-registering the washing machine 400c communicating with the gateway 500 will hereinafter be described.

In addition, it is assumed that the drying machine 400b is stored in the NB list of the refrigerator 400a, the air-conditioner 400e, the washing machine 400c, and the refrigerator 400a are stored in the NB list of the drying machine 400b, and the drying machine 400a and the first lamp (Lamp 1) 400f are stored in the NB list of the air-conditioner 400e. It is also assumed that the air-conditioner 400e and the gateway 500 are stored in the NB list of the first lamp 400f, the drying machine 400b and the TV 400d are stored in the NB list of the washing machine 400c, the washing machine 400c and the second lamp 400g are stored in the NB list of the TV 400d, and the TV 400d and the gateway 500 are stored in the NB list of the second lamp 400g.

Multiple electric devices 400a to 400g periodically communicate with the gateway 500 or the power management unit 300, thereby confirming communication states thereof.

If it is impossible for the washing machine 400c to communicate with the gateway 500 because the user removes the TV 400d, the washing machine 400c recognizes a route error with the TV 400d and confirms its own NB list.

Subsequently, the washing machine 400c deletes its own forward route, and unicasts the RERR (Route Error) message indicating that the washing machine 400c cannot communicate with the TV 400d and the gateway 500 to the drying machine 400b at operation 701.

The drying machine 400b unicasts an RERR to the refrigerator 400a and the air-conditioner 400e present in the NB list of the drying machine 400b at operations 702 and 702', wherein the RERR indicates unavailable communication between the drying machine 400b and the TV 400d. In addition, the air-conditioner 400e unicasts the RERR indicating an unavailable communication state of the TV 400d to the first lamp 400f present in the NB list of the air-conditioner 400e at operation 703, and informs electric devices of each home of an unavailable communication state of the TV 400d.

In this case, the refrigerator 400a includes only the drying machine 400b in the NB list of the refrigerator 400a, so that it does not transmit the RERR message indicating an unavailable communication state of the TV 400d to other electric devices.

In addition, the first lamp 400f transmits the RERR message indicating unavailable communication of the TV 400d to the power management unit 300 through the gateway 500 at operations 704 and 705.

In this case, the power management unit 300 deletes registration information of the TV 400d having been registered in the power management unit 300, and displays the deleted result on the first display 350.

In addition, the power management unit 300 may communicate with the electric device using the gateway 500 as a node through the gateway 500, and may also transmit the RERR message that informs the electric device, that uses the gateway 500 as a node, of an unavailable communication state of the TV 400d at operation 706.

In addition, the washing machine 400c may also broadcast the RERR message indicating that the washing machine cannot communicate with the TV 400d and the gateway 500. In this case, the RERR may include a message indicating that the washing machine 400c cannot communicate with the gateway through the TV.

Accordingly, among the electric devices (400a, 400b, 400e, 400f, and 400g), provided that the TV 400d is present in the NB list, the TV 400d is deleted from the NB list. In addition, if the TV 400d is present in the forward route, the forward route is re-registered. Although the forward route including the TV 400d is deleted, if a communication state with the gateway is possible through any other forward routes, re-registration is not performed.

For example, the second lamp 400g deletes the TV 400d from the NB list. Since the TV is not present in the NB list, the forward list is maintained, and the second lamp communicates with the gateway through the maintained forward route.

The refrigerator 400a includes two forward routes. From among two forward routes, one forward route communicating with the gateway through the TV is deleted, and communicates with the gateway through a forward route including no TV. That is, if there is a forward route communicating with the gateway, re-registration is not performed.

In more detail, the refrigerator 400a includes a first forward route "refrigerator→drying machine→air-conditioner→lamp 1→gateway" and a second forward route "refrigerator→drying machine→washing machine→TV-→lamp 2→gateway". In this case, the refrigerator cannot communicate with the gateway 500 through the second forward route, so that the second forward route "refrigerator→drying machine→washing machine→TV→lamp 2→gateway" is deleted and thus the refrigerator communicates with the gateway 500 using the first forward route "refrigerator→drying machine→air-conditioner→lamp 1→gateway".

The washing machine 400c deletes the TV from the NB list, deletes the forward list and then performs re-registration. A detailed description thereof will hereinafter be described in detail.

A forward list of the washing machine 400c is deleted, only the drying machine 400b is present in the NB list, and no gateway exists. Therefore, the washing machine 400c unicasts the RREQ for searching for the gateway 500 to the drying machine 400b at operation 707.

In this case, the RREQ includes a destination indicating a gateway (Dest. type: Gateway), a hopcount of 0, a source IP address acting as an IP address of the washing machine, and a source ID acting as an IP of the washing machine.

Then, the drying machine 400b receives the RREQ unicast from the washing machine 400c.

The drying machine 400b determines the presence or absence of the gateway 500 in the NB list. The NB list of the drying machine 400b includes the air-conditioner 400e and the washing machine 400c, such that the drying machine 400b determines the absence of the gateway 500 in the NB list.

The drying machine 400b changes a hopcount to '1', generates a reverse route "drying machine→washing machine", and transmits an RREQ to the air-conditioner 400e that is present in the NB list of the drying machine 400b at operation 708.

In the RREQ, the hopcount is changed to '1'.

Subsequently, the air-conditioner 400e receives the RREQ.

The air-conditioner 400e determines the presence or absence of the gateway 500 in the NB list. Since the first lamp 400f is present in the NB list of the air-conditioner 400e, the air-conditioner 400e determines the absence of the gateway 500 in the NB list.

Then, the air-conditioner 400e changes a hopcount to '2', adds the washing machine 400c to a second hopcount list of the air-conditioner 400e, generates a reverse route "air-conditioner→drying machine→washing machine", and transmits the RREQ to the first lamp 400f that exists in the NB list of the air-conditioner 400e at operation 709.

In the RREQ, a hopcount is changed to '2'.

The first lamp 400f receives the RREQ, and determines the presence or absence of the gateway 500 in the NB list. Since the gateway 500 is present in the NB list of the first lamp 400f, the first lamp 400f determines the presence of the gateway 500 in the NB list of the first lamp 400f.

Accordingly, the first lamp 400f changes a hopcount to '3', and adds the washing machine 400c to a third hopcount list of the first lamp 400f.

Subsequently, the first lamp 400f generates a reverse route "gateway→lamp 1→air-conditioner→drying machine→washing machine", and unicasts the RREP along the reverse route. That is, the first lamp 400f unicasts the RREP to the air-conditioner along the reverse route at operation 710.

In this case, the RREP includes an IP address of the gateway, a reverse route, a source IP address and a source ID.

In addition, the first lamp 400f registers the forward route.

In this case, the forward route includes specific information "destination=gateway, and hopcount=1". That is, the hopcount of 1 means that there is only one hop in the range from the first lamp 400f to the gateway.

Subsequently, the air-conditioner 400e receives the RREP unicast from the first lamp 400f, and confirms an ID of the source electric device using the RREP. In this case, since the ID of the air-conditioner 400e is different from an ID of the source electric device, the air-conditioner 400e unicasts the RREP to the drying machine 400b on the basis of the reverse route at operation 711.

In addition, the air-conditioner 400e registers the forward route.

In this case, the forward route includes specific information "next hop=Lamp 1, destination=gateway, and hopcount=2". That is, the hopcount of 2 means that there are two hops in the range from the air-conditioner 400e to the gateway.

Subsequently, the drying machine 400b receives the RREP unicast from the air-conditioner 400e, and confirms an ID of the source electric device using the RREP. In this case, since an ID of the drying machine 400b is not identical to the ID of the source electric device, the drying machine 400b unicasts the RREP to the washing machine 400c on the basis of the reverse route at operation 712.

The drying machine 400b unicasts the RREP to the washing machine 400c on the basis of the reverse route at operation 712.

In addition, the drying machine 400b registers the forward route.

In this case, the forward route includes specific information "next hop=air-conditioner, destination=gateway, and hopcount=3". That is, the hopcount of 3 means that there are three hops in the range from the drying machine 400b to the gateway.

Then, the washing machine 400c receives the RREP unicast from the drying machine 400b, and confirms an IDP of the source electric device using the RREP. In this case, the washing machine 400c confirms that an ID of the washing machine 400c is identical to the ID of the source electric device, and registers a forward route.

In this case, the forward route includes specific information "next hop=drying machine, destination=gateway, and hopcount=4". That is, the hopcount of 4 means that there are four hops in the range from the washing machine 400c to the gateway.

Subsequently, the washing machine 400c transmits a registration request to the gateway on the basis of the forward route. In this case, the gateway 500 authenticates the washing machine 400c. Upon completion of such authentication, the washing machine 400c registers the washing machine 400c, and transmits information of the registered washing machine 400c to the power management unit 300.

The power management unit 300 corrects a forward route from among registration information of the washing machine 400c, performs re-registration of the corrected forward route, and displays re-registration information of the washing machine 400c through the first display 350.

In this way, the power management system can easily re-register the electric device 400 with the power management unit, and perform automation of the installation process of the electric device, resulting in reduction in time and costs for installation manpower.

FIG. 6 is a flowchart illustrating a method for performing re-registration and installation position setting of an electric device contained in the power management system after the electric device has moved to another installation position.

In addition, the drying machine 400b is stored in the NB list of the refrigerator 400a, the refrigerator 400a, the air-conditioner 400e and the washing machine 400c are stored in the NB list of the drying machine 400b, the drying machine 400b and the first lamp 400f are stored in the NB list of the air-conditioner 400e, the air-conditioner 400e and the gateway 500 are stored in the NB list of the first lamp 400f, the drying machine 400b is stored in the NB list of the washing machine 400c, and the gateway 500 is stored in the NB list of the second lamp 2.

Referring to FIG. 6, if an installation position of the TV 400d is changed from a third room (ROOM3) to a fourth room (ROOM4) by the user, it is impossible for the TV 400d to communicate with the gateway 500 through the pre-stored forward route ("TV→Lamp 2→gateway"). That is, the TV 400d determines an unavailable communication state with the gateway.

Then, the TV 400d broadcasts a route request (RREQ) to search for a gateway at operation 801.

In this case, the RREQ includes a gateway destination (Dest. type: Gateway), a hopcount of 0, a source ID address acting as an IP address of the TV, and a source ID acting as an ID of the TV.

Subsequently, RREQ broadcast from the TV 400d is received in the first lamp 400f that is capable of communicating with the TV 400d.

The first lamp 400f determines the presence or absence of the gateway 500 in the NB list of the first lamp 400f. If the gateway 500 is present in the NB list of the first lamp 400f, so that the first lamp 400f determines the presence of the gateway 500 in the NB list of the first lamp 400f.

Therefore, the first lamp 400f adds the TV 400d to the NB list of the first lamp 400f, and the hopcount is changed to 1 and stored.

The first lamp 400f generates a reverse route "gateway-→lamp 1→TV", and unicasts an RREP along the reverse route. That is, the first lamp 400f unicasts the RREP to the TV 400d along the reverse route at operation 802.

In this case, the RREP may include an IP address of the gateway 500, a reverse route, a source IP address, and a source ID.

In addition, the first lamp 400f registers a forward route.

In addition, the forward route includes specific information "destination=gateway, and hopcount=1". That is, the hopcount of 1 means that there is only one hop in the range from the first lamp 400f to the gateway 500.

Subsequently, the TV 400d receives the RREP unicast from the first lamp 400f, and confirms an ID of the source electric device using the RREP. In this case, an ID of the TV 400d is identical to an ID of the source electric device such that the TV 400d generates a forward route.

In this case, the forward route includes specific information "next hop=Lamp 1, destination=gateway, and hopcount=2". That is, the hopcount of 2 means that there are two hops in the range from the TV 400d to the gateway 500.

The TV 400d regenerates and stores the forward route, and then transmits the forward route to the power management unit 300.

In this case, the power management unit 300 corrects registration information of the TV 400d, performs re-registration of the TV 400d, and informs a user of an information message indicating installation position setting.

That is, the power management unit 300 communicates with the TV 400d, informs the user of the changed installation position of the TV 400d through the first display 350, and displays an information message for installation position setting.

In this case, if the user selects the electric device selection button 341 of the first input unit 340 and the installation position setting button 342, lighting of the second display 450 of the TV 400d is controlled, and an information message that directs the user to select a room number of a room for which the second display is turned on is displayed.

In addition, if the number of electric devices having a changed installation position is only one, the user need not enter the electric device selection button 341.

Subsequently, the user confirms which room includes a lighted-on second display 450 of the TV 400d, and selects a number of the confirmed room.

That is, if the user selects a fourth room (ROOM4) including the TV 400d from among several rooms 343 of the first input unit 340, the power management unit 300 contains an installation position of the TV 400d in re-registration information of the TV 400d, and stores the same.

In this way, installation position setting of the electric device becomes easier, and an installation position of each electric device is established, such that power for each room can be managed.

As is apparent from the above description, according to the embodiments of the present disclosure, an electric device can be automatically registered/re-registered in the electric device or be deleted from the electric device, a power management system and electric devices can be easily managed.

Thus, time consumed for the power management system performing registration, deletion, and correction of each electric device can be reduced. In addition, the above-mentioned processes are automatically performed, and service costs for registration, deletion, and registration of the electric device can be greatly reduced.

In addition, if the user moves the electric device from a current position to another position, the power management system recognizes the movement, informs the user of the recognition result and at the same time turns on an indication lamp for each room in such a manner that the user can recognize which room contains the electric device. In addition, the user can establish the position of the corresponding electric device, the location of the corresponding electric device can be easily established after the electric device moved to another position.

According to the embodiment of the present disclosure, users of all ages and users unfamiliar with digital devices can easily perform registration, re-registration, and deletion of the electric device, resulting in maximum user convenience and easier user access.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An electric device comprising:
   a communication unit configured to communicate with at least one of a gateway and a plurality of other electric devices; and
   a controller configured to broadcast a gateway search request signal for searching for a gateway, control the communication unit to automatically transmit a registration request signal to at least one of the gateway and the plurality of other electric devices for registering the electric device to the gateway if the communication unit receives a gateway search response signal,
   wherein the controller is configured to read a NodeB list in which at least one of the gateway and the other electric devices is used as a NodeB,
   upon receiving a gateway search request signal from at least one of the plurality of other electric devices, the controller is configured to determine whether the gateway is present in the NodeB list, and controls transmission of a gateway search response signal to the at least one other electric device when gateway information is present in the NodeB list,
   the controller controls transmission of the gateway search request signal to other electric devices stored in the NodeB list when the gateway is not present in the NodeB list.

2. The electric device according to claim 1, wherein the controller performs authentication with the gateway, and transmits a registration request signal to the gateway upon completion of the authentication.

3. The electric device according to claim 1, wherein:
   the gateway search request signal includes a unique IP address, a unique ID and destination information directed to the gateway; and
   the gateway response signal includes an IP address of the gateway and a forward route to the gateway.

4. The electric device according to claim 3, further comprising a storage unit configured to store the NodeB list, unique IP address, unique ID, IP address of the gateway, and forward route,
   wherein the controller controls communication with the gateway on the basis of the IP address of the gateway, and controls transmission of the unique IP address, the unique ID, and the forward route to a power management unit.

5. The electric device according to claim 4, wherein the controller generates a reverse route when the gateway is present in the NodeB list of the storage unit.

6. The electric device according to claim 4, wherein the controller determines which one of the other electric devices stored in the NodeB list of the storage unit is an unavailable-communication other electric device incapable of performing communication, and deletes the determined electric device from the NodeB list.

7. The electric device according to claim 6, wherein the controller transmits information regarding the unavailable-communication other electric device to the gateway, and commands the gateway to delete the unavailable-communication other electric device.

8. The electric device according to claim 6, wherein the controller regenerates the forward route when the unavailable-communication other electric device is present in the forward route, and transmits the regenerated forward route to the power management unit.

9. The electric device according to claim 6, wherein the controller, if a plurality of forward routes exists and the unavailable-communication other electric device is present in at least one of the forward routes, deletes the at least one forward route, and controls communication with the gateway on the basis of the remaining forward routes.

10. The electric device according to claim 6, further comprising:
    a display capable of being lighted on,
    wherein the controller, if an installation position setting signal is transmitted from the gateway, controls lighting of the display.

11. A method of controlling an electric device which communicates with at least one of a gateway and a plurality of other electric devices, the method comprising:
    broadcasting a request signal for searching for a gateway;
    receiving a gateway search response signal from at least one of the gateway and the plurality of other electric devices;
    transmitting a registration request signal to at least one of the gateway and the plurality of other electric devices for registering the electric device to the gateway;
    after transmission of a gateway search request signal from at least one of the other electric devices, determining whether the gateway is present in a NodeB list;
    automatically controlling transmission of the gateway search response signal to the at least one other electric device if gateway information is present in the NodeB list; and
    if the gateway is not present in the NodeB list, controlling transmission of the gateway search request signal to the other electric devices stored in the NodeB list.

12. The method according to claim 11, further comprising:
    performing authentication with the gateway; and
    transmitting a registration request signal to the gateway upon completion of the authentication.

13. The method according to claim 11, further comprising:
    upon transmission of the gateway search response signal, regenerating a forward route on the basis of the gateway search response signal, and
    storing the forward route.

14. The method according to claim 13, further comprising:
    controlling communication with the gateway on the basis of an IP address of the gateway present in the gateway search response signal; and controlling transmission of a unique IP address, a unique ID, and the forward route.

15. The method according to claim 11, wherein the transmission of the gateway search request signal includes:
    transmitting the unique ID and unique IP address of the at least one of the other electric devices that has generated the gateway search request signal.

16. The method according to claim 11, wherein the controlling of the transmission of the gateway search response signal to the at least one other electric device if the gateway information is present in the NodeB list includes:
    generating a reverse route from the gateway to an electric device having generated the gateway search request signal;
    deleting, if an unavailable-communication other electric device is present, the unavailable-communication other electric device from the NodeB list; and
    transmitting information regarding the unavailable-communication other electric device to the gateway, and commanding the gateway to delete registration information of the unavailable-communication other electric device.

17. The method according to claim 16, further comprising:
    regenerating a forward route if the unavailable-communication other electric device is present in the forward route; and
    transmitting the regenerated forward route to the gateway.

18. The method according to claim 16, further comprising:
    deleting, if a plurality of forward routes exists and the unavailable-communication other electric device is present in at least one of the forward routes, the at least one forward route; and
    controlling communication with the gateway on the basis of remaining forward routes.

19. The method according to claim 11, further comprising:
    determining a presence or absence of an unavailable-communication electric device incapable of performing communication; and
    broadcasting, if the presence of the unavailable-communication electric device is determined, information of the unavailable-communication electric device as a route error message.

20. The method according to claim 19, further comprising:
    broadcasting a request signal for re-searching for the gateway;
    regenerating a forward route on the basis of the gateway search response signal when a gateway search response signal is transmitted from at least one of the gateway and the other electric devices; and
    transmitting the regenerated forward route to the gateway so as to request re-registration.

* * * * *